Figure 1:
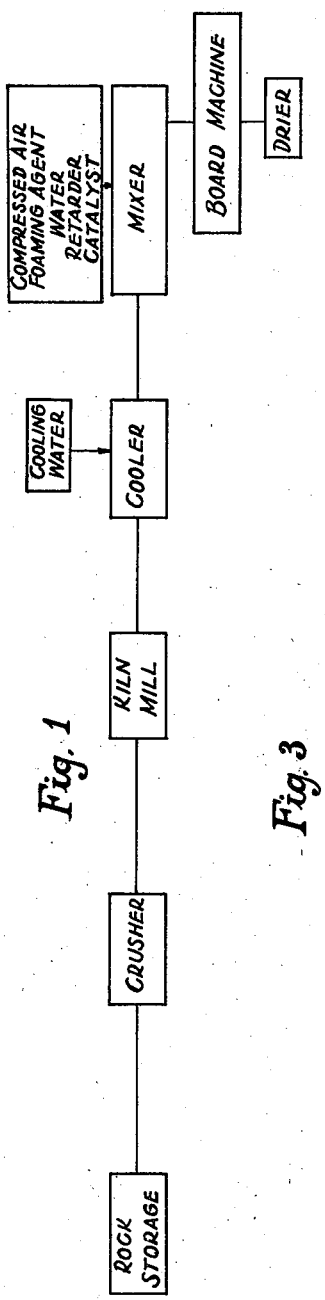

Oct. 29, 1946.    L. A. PALEY    2,410,390
QUICK-SETTING ANHYDRITE AND ITS MANUFACTURE
Filed July 5, 1941    6 Sheets-Sheet 1

INVENTOR
LEWIS A. PALEY
BY Thiess, Olson, &
Mecklenbarger.
ATTORNEYS

Oct. 29, 1946.  L. A. PALEY  2,410,390
QUICK-SETTING ANHYDRITE AND ITS MANUFACTURE
Filed July 5, 1941  6 Sheets-Sheet 2

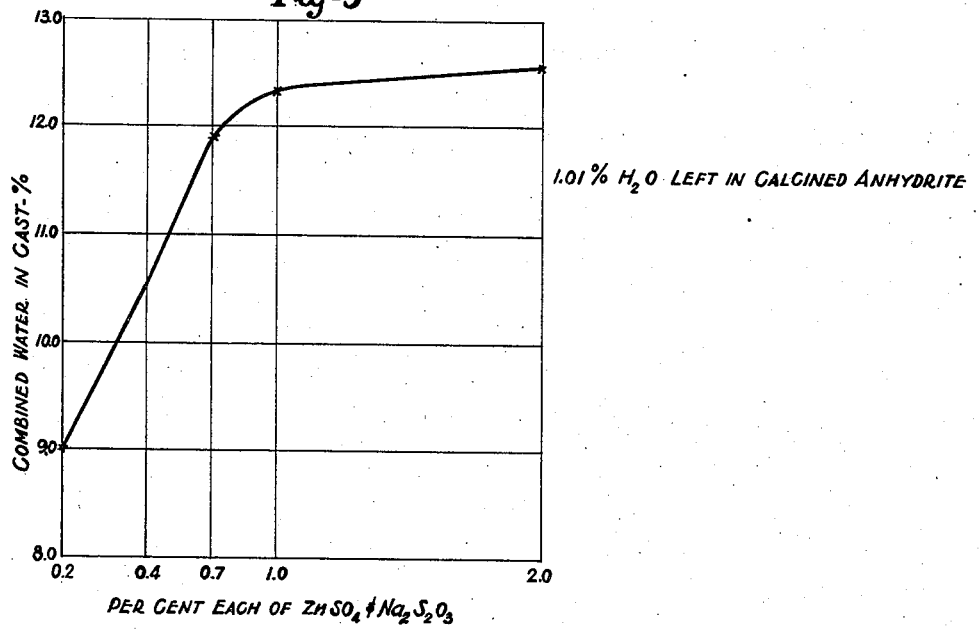
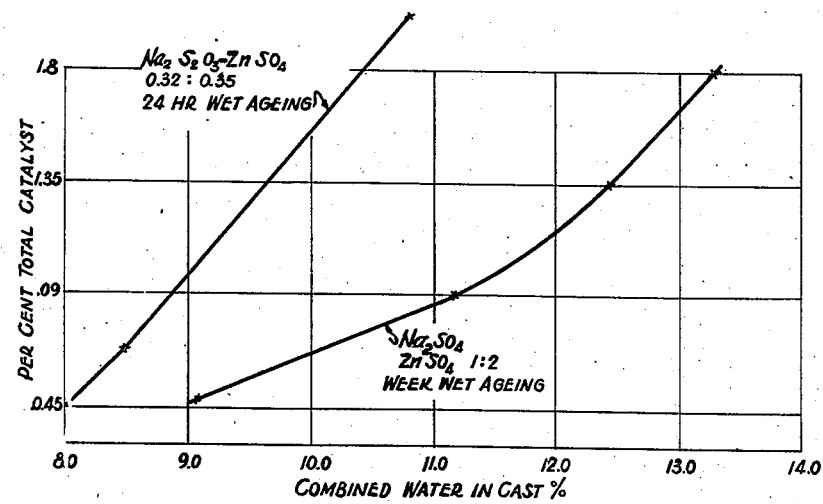

Oct. 29, 1946.   L. A. PALEY   2,410,390
QUICK-SETTING ANHYDRITE AND ITS MANUFACTURE
Filed July 5, 1941   6 Sheets—Sheet 6
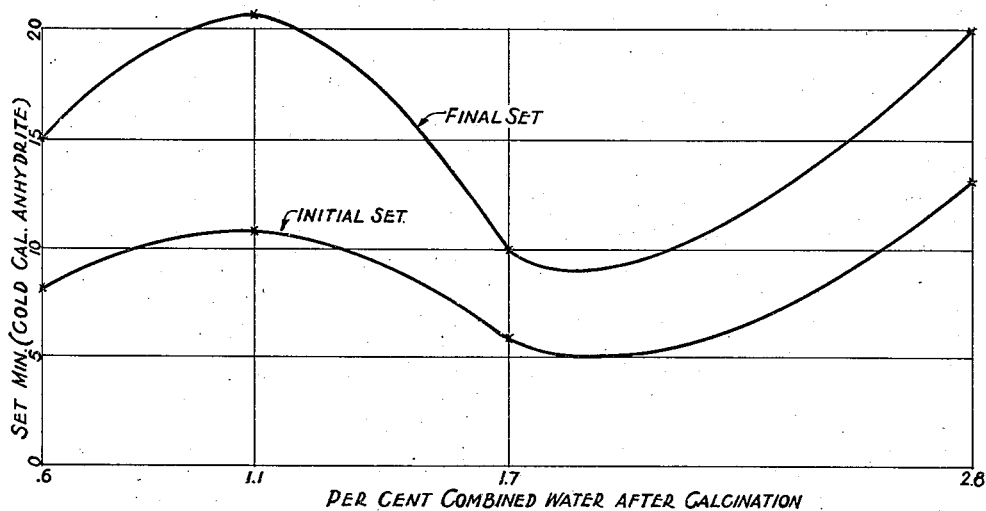
Fig. 8   PARTIAL CALCINATION OF ANHYDRITE (COARSE GROUND)
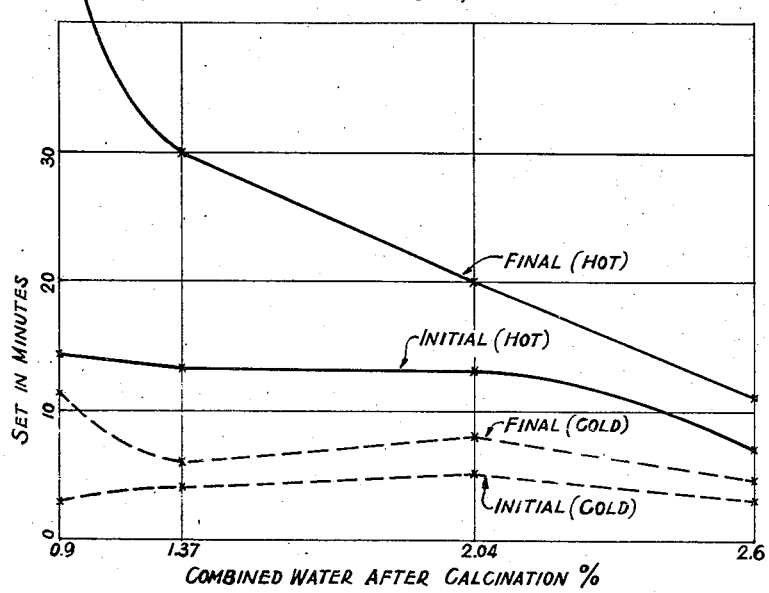
Fig. 9
$K_2SO_4$ + CALCINED ANHYDRITE—SETTING TIME
INVENTOR
LEWIS A. PALEY
BY Thiess, Olson, &
Mecklenburger.
ATTORNEYS Patented Oct. 29, 1946

2,410,390

UNITED STATES PATENT OFFICE 2,410,390

QUICK-SETTING ANHYDRITE AND ITS MANUFACTURE

Lewis A. Paley, Glen Ellyn, Ill., assignor to United States Gypsum Company, Chicago, Ill., a corporation of Illinois Application July 5, 1941, Serial No. 401,212

1 Claim. (Cl. 106—109)

This invention relates to the manufacture of quick-setting anhydrite.

The mineral anhydrite or calcium sulfate occurs in extensive deposits throughout the world. It is usually found associated with more or less gypsum ($CaSO_4.2H_2O$) and is rarely completely anhydrous. In many cases the gypsum exists as masses separate from the anhydrite, and is mined and calcined to form the plaster of Paris of commerce. Because of its quick setting characteristics, plaster of Paris or calcium sulfate hemihydrate is used in very large quantities in automatic forming machines for the manufacture of gypsum boards and blocks. The natural anhydrite has little or no setting qualities and, even in the presence of substantial quantities of chemical accelerators or catalysts, it sets so slowly that its use in automatic forming machines is precluded. In some localities, a deposit may consist of 95% of anhydrite and 5% of gypsum, so that in the industry it is common practice to mine around the anhydrite so as to get only the gypsum, because of the vast difference in setting times between the two materials. If any lumps high in anhydrite occur in the gypsum which is mined, these lumps are methodically sorted out by hand and sent to the waste piles. Enormous piles of intermixed anhydrite and gypsum have accumulated around gypsum mills through the years of operation. The hand sorting of course adds to the expense of producing the hemihydrate, and the enormous reserves of anhydrite lie unused because of the difficulty of making the anhydrite set fast enough for use in automatic forming machines. The industry has found that anhydrite is a serious adulterant in hemihydrate plaster, as it weakens the strength of the casts made from it and lowers the grade of the plaster containing such anhydrite.

The enormous size of the anhydrite deposits may be appreciated from the fact that, particularly in Canada, entire mountains are formed of anhydrite. Millions of tons of anhydrite exist over the world. The vastness of these anhydrite reserves has led numerous investigators to conduct researches in order to find means and methods whereby to shorten the setting time of anhydrite so that it might be used in automatic forming machines at a reasonable processing cost. The patent and scientific literature is full of suggestions of one kind or another for shortening the setting time of anhydrite, usually expressed in hours or days. In all cases the strongly retarding influence of the gypsum impurity in the anhydrite on the setting time has been completely overlooked. Limestone is another impurity commonly found in anhydrite but apparently has little influence on the setting time of the anhydrite. In different deposits of anhydrite, the gypsum impurity will range from 2% to 50% or more, and the gypsum impurity will vary in a single deposit from point to point, a common percentage being 25%.

An object of the invention therefore is to provide a method of treating natural anhydrite so as greatly to shorten its setting time and to permit it to be handled by automatic forming machines.

Another object of the invention is to provide a method for the treatment of natural anhydrite so as to produce therefrom a material which, when gauged with water, will exhibit very rapid set and produce relatively strong casts, which further increase in hardness if wet aged due to the gradual setting of the natural anhydrite component, particularly when the latter is also under the influence of set-inducing catalysts.

A further object of the invention is to provide improved quick-setting anhydrite compositions; also to improve quick-setting anhydrite, its compositions, and its method of preparation in other respects hereinafter specified and claimed.

I have discovered that natural anhydrite normally containing gypsum impurity may be calcined so that substantially all of the gypsum impurity is dehydrated to the "second settle" or soluble anhydrite stage. This mixture of insoluble and soluble anhydrite has a setting time even shorter than the setting time of ordinary plaster of Paris. If the anhydrite is incompletely calcined so that the gypsum impurity exists in the "first settle" or hemihydrate state, as in the kettle process, the mixture of natural anhydrite and hemihydrate has a prolonged setting time, and the resulting cast is weak and inferior. The hemihydrate and calcined natural anhydrite seem to be mutually retarding in action.

Now, if accelerator salts are added to a mixture of calcined natural anhydrite and soluble anhydrite, the setting time of the mixture is considerably faster than that of plaster of Paris, in fact is almost instantaneous. A final set of 2 minutes, as tested with a Gilmore needle, is easily obtained. The set of this mixture is so fast that it is almost impossible to get the plastic mixture formed into the desired shape before setting takes place. A retarder is therefore added to hold up the set a sufficient time so that the plastic mix may be formed into the desired shape, such as board or block. This quick setting phenomenon of calcined anhydrite is so extraordinary and unexpected that an investigator is apt to unwittingly stir or mix past the set, in which case the strength of the cast is greatly impaired or destroyed. The use of a retarder in an accelerated mix is generally desirable if a high strength in the cast is to be obtained, since otherwise the mix would be stirred past its set.

Figure 3:
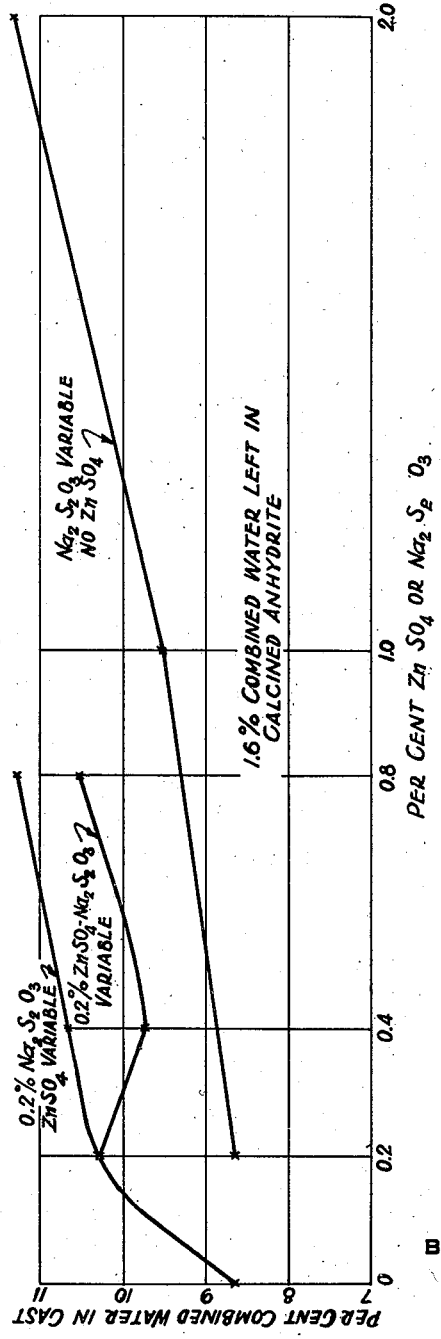
Figure 2:
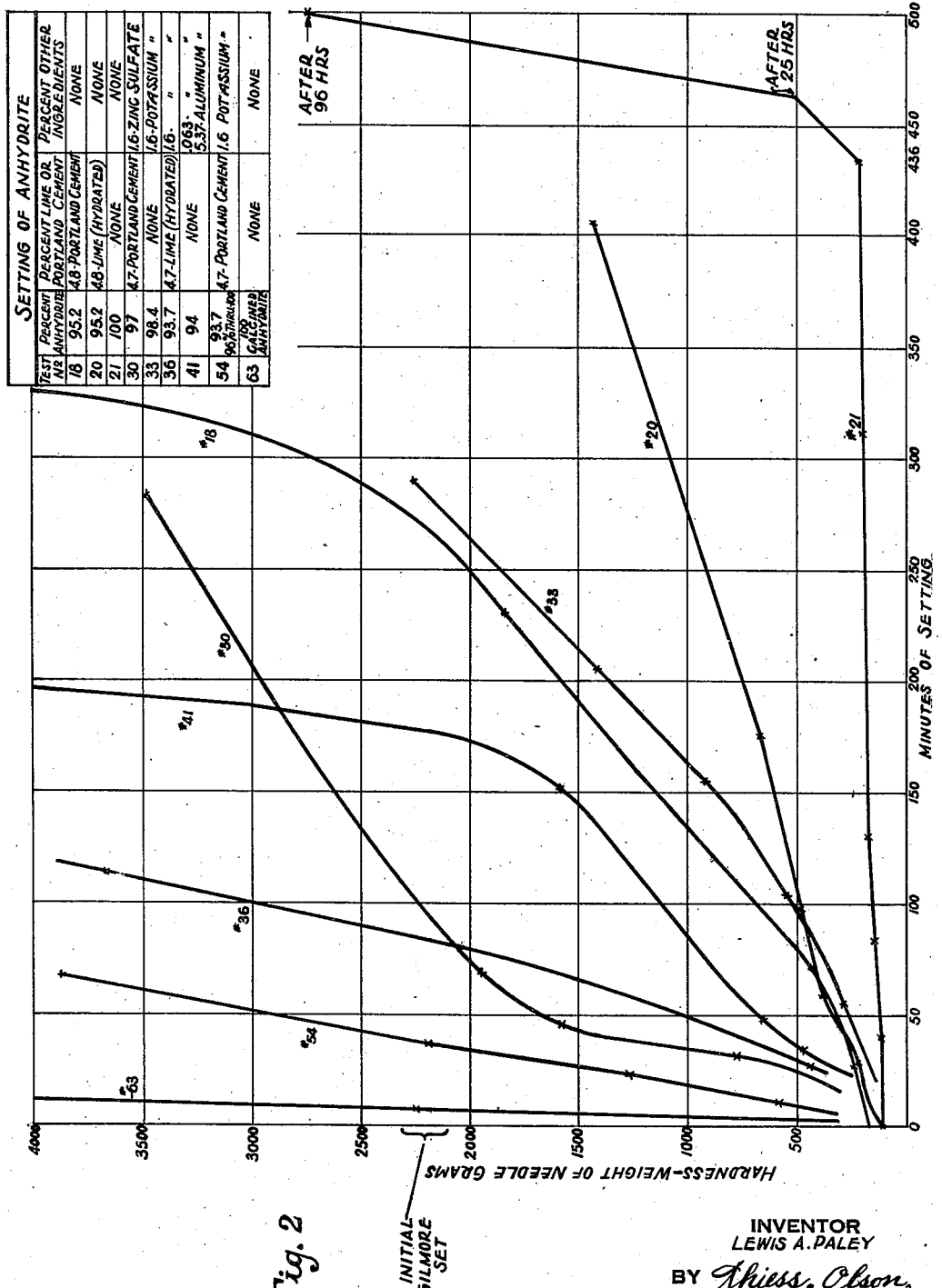
Figure 4:
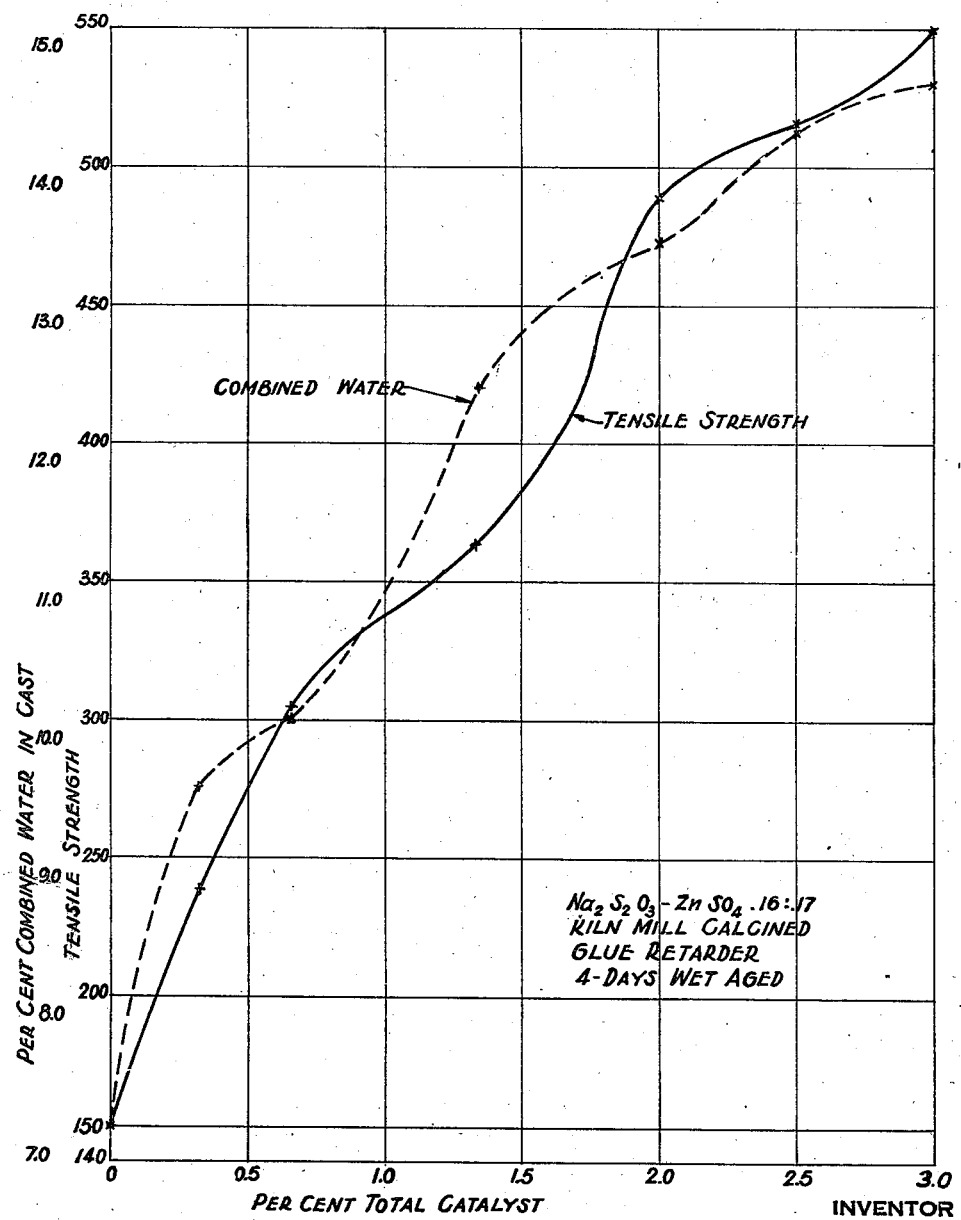
Figure 7:
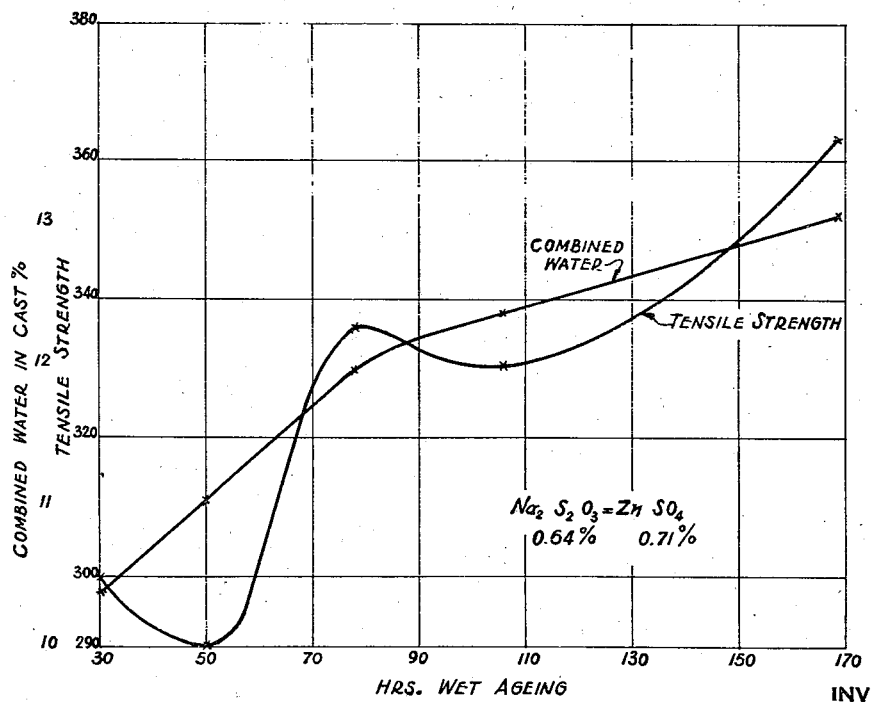

In order to illustrate my experimental work on this subject, I append certain drawings showing in graphical form the habits and vagaries of the quick-setting anhydrite and its compositions together with a flow sheet of its manufacture, in which Fig. 1 is a flow sheet showing one method of preparing and molding my quick-setting anhydrite to form paper covered building boards of commerce, Fig. 2 is a graphical representation of the setting rate of anhydrite under various influences, Fig. 3 is a graph plotting percentage of certain catalysts against the percentage of combined water in the cast, Fig. 4 is a graph plotting percentage of catalyst against percentage of combined water in the cast and tensile strength of the cast, Figs. 5 and 6 are graphs plotting percentage of catalyst against the percentage of combined water in the cast under different conditions, Fig. 7 is a graph plotting hours of wet aging against percentage of combined water in the cast and tensile strength, and Figs. 8 and 9 are graphs plotting percentage of combined water after calcination against the setting time under different conditions.

In my improved process the anhydrite rock from the mine is crushed to pieces of one inch diameter and finer. This crushed rock is preferably fed to a kiln mill of the rotating hammer and screen type, to which hot gases of combustion are introduced so that simultaneous grinding and calcination takes place. The mill is provided with an air separator, and tailings return to the mill, so that nearly all the hot calcined anhydrite issuing from the mill will pass through a 325-mesh screen. With the temperature in the kiln so adjusted that the temperature of the delivered calcined anhydrite will be about 295° F., the combined water in the natural anhydrite mixture will be reduced from 6.5% in the anhydrite feed to 0.9% in the calcined anhydrite delivered. This calcined anhydrite is preferably then cooled down to room temperature. It has a strong affinity for moisture in the air, and if it is to be stored for any length of time at room temperature it should be kept in a closed bin or vapor-proof bags, since otherwise it will deteriorate. The soluble anhydrite in the mixture is the ingredient which has a strong affinity for the moisture in the air and is the ingredient which is responsible for the quick setting characteristics of the anhydrite. Kettle calcination may be employed if air agitation is used in the kettle, as the anhydrite is heavy and hard on the sweeps or agitators of the kettle.

In order to produce a cast from the resulting material, irrespective of the type of calcination employed, the cooled calcined anhydrite is then mixed with about 30% of water in which are dissolved small quantities of catalysts, such as a mixture of sodium thiosulfate and zinc sulfate. A retarder, preferably consisting of a small quantity of animal glue, is also dissolved in the gauging water. The resulting plastic mixture is then molded into the desired shape, such as gypsum tiles or paper covered gypsum boards, and promptly sets to a solid cast. The setting time may be readily regulated from 2 minutes to 20 minutes by controlling the amount of glue retarder added. The boards or tiles are then dried in a tunnel drier or by other suitable means. Under these conditions, the set cast will contain 7% to 16% of combined water, depending on the amount of catalyst used and other factors. My calcined anhydrite has a low consistency of about 30–40 ml., so that the resulting cast will be hard, dense and heavy. If it is desired to produce a low density cast, a foaming agent and compressed air may be introduced into the mixer to produce a cast containing a multiplicity of air bubbles. Sulfuric acid added to the gauging water will attack the limestone impurity in the anhydrite, generate carbon dioxide and produce a low density cast. The apparatus disclosed in my application Serial No. 311,771, filed December 30, 1939, may be used, except that provision should preferably be made for cooling the calcined anhydrite between the kiln mill and the mixer. If it is desired to ship the calcined anhydrite for use as a plaster, the powdered catalysts may be mixed dry with the calcined anhydrite together with the dry glue retarder, the latter being preferably suitably dispersed on powdered limestone or other inert, nonalkaline diluent.

For many purposes it will be unnecessary to add a catalyst or even a retarder to the calcined anhydrite. If no catalyst is added, the set cast will contain only approximately the percentage of combined water of the original uncalcined anhydrite, there being merely the rehydration of the soluble anhydrite to the dihydrate. Such casts will have medium strength and hardness. If catalysts are used, the set cast will have a considerably higher amount of combined water, by reason of the hydration of the natural anhydrite as well as of the soluble anhydrite. Thus with natural uncalcined anhydrite containing 6.5% combined water, calcination in a kiln mill reduced the combined water to 0.9%, and on rehydration in the presence of catalysts a product containing as high as 16% of combined water was obtained. Thus on rehydration 5.6% water combined with the soluble anhydrite and 9.5% combined with the natural anhydrite. When no catalyst is used, it will generally be found unnecessary to use retarder. The type of retarder used is important, as it should be nonalkaline. Thus a neutral animal glue solution is very satisfactory, but commercial lime-containing retarder commonly used in gypsum plaster is unsatisfactory because of its alkalinity. Any alkalinity considerably reduces the strength of the cast and may lengthen the setting time. A possible exception to this statement is in the use of Portland cement as a catalyst, which is alkaline and yet produces quite high strength in the cast. So-called "sodate" retarder, consisting of sodium acetate dispersed on ground silica, is also satisfactory, although it does not produce as high strength in the cast as does glue. Glue retarder is especially advantageous, as it migrates to the surface of the cast and causes the cast to adhere to the surface therewith in contact, such as wood or the cover sheets of a gypsum board. Thus the glue serves the double purpose of retarder and bonding agent. Only a minute amount of glue retarder is necessary, and 0.01% to 0.03%, based on the calcined anhydrite, will usually be found sufficient, although this may be increased to 1% or more if it is desired to increase the adhesive character of the mix and to increase the setting time. 0.1 to 0.3% sodate retarder will usually be found sufficient. Oxalic acid may also be used as a retarder.

As accelerating catalysts, a variety of chemical salts may be used, with the exception of the alums and aluminum sulfate, which tend to lower the strength of the cast. I prefer the combination of zinc sulfate and sodium thiosulfate, as high strengths of the cast are thereby produced. Potassium sulfate and zinc sulfate is also a good combination. The double salt $K_2Zn(SO_4)_2$ may also be used. Sodium sulfate, copper sulfate, ferrous sulfate, magnesium sulfate, and ammonium sulfate are all good accelerators. A combination of Portland cement and potassium sulfate produces quick set with calcined anhydrite. Sulfuric acid is a good catalyst and reacts with the limestone impurity in calcined anhydrite to liberate carbon dioxide, which produces a lightweight porous cast. The sulfuric acid may be used in combination with other catalysts. Many of the catalyst salts may be used alone with good results.

The calcined anhydrite may be cast under pressure, using small amounts of mixing water to form a moist, crumbly mix. The mix need be consolidated only momentarily in the press, and the set will take place after the pressure is released. A cast made in this way had a monotron hardness of 242 and a water absorption, after 24 hrs. immersion, of only 2.1%, and had a specific gravity of 2.3. In order to produce weatherproof exterior blocks, 20–35% of sand or other mineral particles may be introduced into the mix. After pressing, setting and drying, the surface of the block may be washed with a spray of water to bare the sand grains. A commercial cement paint may then be applied to the surface, forming a natural bond with the sand granules due to the chemical action of the lime in the cement paint.

In order to illustrate the efficiency of several of the catalysts in their action on uncalcined anhydrite, various mixes of the uncalcined anhydrite were made up and their hardness tested with a small Gilmore needle with a box fitted to the stem. Lead shot were run into the box until the needle sank into the mix up to the ball. The weight of the shot was then taken as a measure of the hardness of the mix. In Fig. 2, curve 21, is illustrated the hardening of the uncalcined anhydrite, without catalysts, showing it to be very slow, 25 hours being required to reach a hardness of 500 and 96 hours to reach one of about 2750. Obviously this hardening is entirely too slow for any useful commercial purpose. Curves 18, 20, 30, 33, 36, 41 and 54 illustrate the hardening of the uncalcined anhydrite with the different catalysts as shown in the table which appears in the figure. Curve 63 illustrates the hardening of my calcined anhydrite, without catalysts of any kind. In the presence of catalyst salts, the hardening of my calcined anhydrite is almost instantaneous. In fact, with catalyst salts mixed with my calcined anhydrite, a neutral retarder must be used to permit molding and to hold up the flash set. This fast set is a matter of great technical importance, as it permits the calcined anhydrite to be handled on automatic forming machines. With the modern gypsum board machines, a board speed in excess of 100 feet per minute is often obtained. A set of 4½ to 8 minutes is obtained when using accelerators with plaster of Paris or hemihydrate. With calcined anhydrite, a set of 2 minutes can easily be obtained, so that still higher board speeds are possible. Fast set is also important on automatic block molding machines. If the set is too long, the board or block machine must be of great size in order to produce a reasonable amount of product per hour. Due to the low consistency of the anhydrite, and the small amount of water in the set cast, drying costs are greatly reduced, so that, counting the cost of chemical catalysts, the net cost is usually slightly less per ton of product than when gypsum is used as a raw material.

In Fig. 3, I illustrate how the combined water content in the cast varies with different percentages of the preferred catalyst salts, sodium thiosulfate and zinc sulfate. With perfect hydration, the theoretical combined water in the cast would be about 20%, neglecting limestone and other impurities. I have obtained up to 16% combined water in the cast.

In Fig. 4 is shown the combined water in the cast and tensile strength plotted against the percentage of total catalyst. It will be seen that almost any desired strength in the cast may be obtained by regulating the amount of catalyst added to the mix.

Fig. 5 illustrates the manner in which the combined water in the cast varies with equal parts of $ZnSO_4$ and $Na_2S_2O_3$ as catalysts. In this experiment, ground anhydrite was ball milled and calcined in an open pan to leave 1.01% of combined water in the calcined anhydrite.

In Fig. 6 is illustrated the combined water in the cast for different catalyst combinations and different periods of wet aging. In these tests, some ground anhydrite was put through a "Raymond" mill for fine grinding and was then calcined in an open pan calciner. The calcined anhydrite contained 0.6% of combined water. This graph shows the advantages of storing the product moist for a period before drying, as thereby the combined water in the cast is increased. Thus, if the board or block is to be stored moist for a time before drying to increase the strength and hardness of the core, then a moist storage room may be used ahead of the drier, or the drier eliminated, in which case the flow diagram illustrated in Fig. 1 would be modified so to indicate.

Fig. 7 illustrates that as the hours of wet aging increase, the combined water in the cast steadily increases, but the tensile strength increases more irregularly. This result would be expected, as the material is a heterogeneous mixture of soluble anhydrite and natural anhydrite, setting up in two different phases.

In Fig. 8 I employed coarse ground anhydrite calcined in an open pan to varying percentages of combined water remaining in the calcined anhydrite. The initial and final setting times of the calcined anhydrite, cooled down to room temperature, was determined, using no catalyst or retarder. For some of the weaker casts, it will be desirable to use calcined anhydrite without either catalyst or retarder, and these curves show the setting times which may be expected. With cold calcined anhydrite finished at 295° F. in a kiln mill and containing 0.9% combined water, without catalyst but with 0.015% glue retarder, the initial set was found to be 5 minutes and the final set 8 minutes. With calcined anhydrite finished at 370° F. in a kiln mill, the combined water in the calcined anhydrite was also 0.9% and the cold initial set was 2½ minutes and the final set 4 minutes without the use of catalyst but with 0.015% glue retarder.

In Fig. 9 are illustrated the setting times of hot and cold ball milled anhydrite partially calcined in the presence of 0.3% potassium sulfate, no other catalyst being used. In obtaining the hot setting times, the hot calcined anhydrite was quickly immersed in the gauging water, steam being given off. To obtain the cold setting times, the calcined anhydrite was cooled down to room temperature before mixing with the gauging water. These curves show the desirability of cooling the calcined anhydrite to room temperature before mixing, as the setting time is thus considerably shorter.

From the above described graphs, it will be evident that the calcined anhydrite is influenced by a number of variables as to the results obtained. The hemihydrate commonly used for the production of board and block has a tensile strength in the cast of 200–250 pounds per square inch. Hemihydrate calcined in the presence of calcium chloride has a tensile strength of 300–400 pounds per square inch. Pressure calcined hemihydrate has a tensile strength of 500–650 pounds per square inch. By properly selecting conditions, calcined anhydrite to equal any of these figures can be produced.

As an example of the best practice, which I prefer, the following directions are given: Anhydrite, as mined, is crushed to lumps of 1 inch diameter or finer, and this rock is passed through a rotating hammer type kiln mill, where simultaneous grinding and calcination takes place. Anhydrite is hard and difficult to grind, but by calcining during grinding, the grinding is less difficult, as the heat aids in the disintegration. A finishing temperature of about 300° F. should be used except when very rapid sets are desired, when a finishing temperature of about 370° F. may be used. Higher temperatures than 700° F. are to be avoided, as some of the soluble anhydrite may be converted into insoluble anhydrite. The calcined anhydrite is then cooled to room temperature, or somewhat above, and can be mixed with water and molded into the desired shape. With the rotor disclosed in my application Serial No. 311,771 turning at about 800 R. P. M., no retarder will be needed, as the calcined anhydrite is mixed with water and extruded in board or block form in a very short time, and before setting can take place. The initial set will be found to be about 1½ to 5 minutes and the final set 4 to 8 minutes. When a stronger cast is desired, about equal parts of sodium thiosulfate and zinc sulfate are dissolved in the gauging water together with about 0.015–0.03% of glue solution as a retarder. If the forming is fast enough, the retarder may be omitted. The total catalyst percentage may vary from 0.3% to 3.0%, depending on the strength desired in the cast. The set product will contain about 20–25% free moisture and is preferably, but not necessarily, stored moist for 1 to 7 days before drying, to permit the strength and combined water to increase. In some cases it will be unnecessary to dry at all, and the product can be shipped to air dry on the job. By incorporating dry soluble anhydrite in the surface of the board core during the forming stage as disclosed in said application, the free water in the cast may be still further reduced.

It might be mentioned that set board and block made by the use of hemihydrate contain about 65% of free moisture, so that drying is always necessary.

As previously disclosed, anhydrite as mined contains widely varying percentages of gypsum. With anhydrite containing 6% of combined water or more, my process operates very satisfactorily. With purer anhydrite, containing 3% combined water or less, it may be found desirable to add gypsum to the anhydrite before calcining in order to produce a quick set. Instead of this procedure, soluble anhydrite may be separately prepared from gypsum and then mixed with the calcined anhydrite in desired proportions to produce a quick set.

In order to compare the setting time of soluble anhydrite prepared from gypsum with that of my calcined anhydrite, I calcined in an open pan a quantity of "land plaster" or ground gypsum until it had reached the anhydrous or soluble anhydrite stage. After cooling, this soluble anhydrite when mixed with water showed an initial Gilmore set of 15 minutes and a final set of 24 minutes. When a trace of ground gypsum block accelerator was added to this same soluble anhydrite, the initial set was 2 minutes and the final set 5 minutes. As previously pointed out, the anhydrite calcined in a kiln mill with a finishing temperature of 370° F. showed an initial set, in the presence of 0.015% glue retarder, of 2½ minutes and a final set of 4 minutes. Ordinary kettle calcined hemihydrate plaster or plaster of Paris showed an initial set of 7 minutes and a final set of 10 minutes. It is thus evident that my retarded calcined anhydrite has a faster set than soluble anhydrite and hemihydrate plaster. The retarded calcined anhydrite is substantially equal in set to accelerated soluble anhydrite. It will be seen that while uncalcined anhydrite is exceedingly slow in set, the surprising fact is that the calcined anhydrite is the fastest setting material known to the industry.

Thus in the above description I have disclosed how the large deposits of natural anhydrite may be processed to produce a quick-setting plaster having a considerably faster set than any other material and suitable for molding board, block or other articles, for use on automatic forming machinery. The effects of the gypsum impurity in the anhydrite have been studied, and a way has been disclosed to convert this gypsum impurity into a valuable setting agent. The several variables affecting the setting of the calcined anhydrite have been illustrated in graphical form.

I state in conclusion that while the examples illustrated constitute practical embodiments of my invention, I do not wish to limit myself precisely to these details, since manifestly the same may be considerably varied without departing from the spirit of the invention as defined in the appended claim.

I claim:

A plastic mixture suitable for molding purposes, comprising calcined anhydrite, zinc sulfate, sodium thiosulfate, glue and water.

LEWIS A. PALEY.